US008879428B2

(12) United States Patent
Hui et al.

(10) Patent No.: US 8,879,428 B2
(45) Date of Patent: Nov. 4, 2014

(54) SYSTEMS AND METHOD FOR GRAPH-BASED DISTRIBUTED PARAMETER COORDINATION IN A COMMUNICATION NETWORK

(75) Inventors: Dennis Hui, Sunnyvale, CA (US); Jiann-Ching Guey, Fremont, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 226 days.

(21) Appl. No.: 13/308,776

(22) Filed: Dec. 1, 2011

(65) Prior Publication Data

US 2013/0142078 A1    Jun. 6, 2013

(51) Int. Cl.
  *H04L 12/28*    (2006.01)

(52) U.S. Cl.
  USPC ............................................ 370/255; 370/254

(58) Field of Classification Search
  USPC .......................................... 370/255, 342, 254
  See application file for complete search history.

(56) References Cited

U.S. PATENT DOCUMENTS

| 2005/0078737 | A1* | 4/2005 | Craig et al. | 375/132 |
| 2007/0168832 | A1* | 7/2007 | Richardson et al. | 714/758 |
| 2008/0212549 | A1* | 9/2008 | Park et al. | 370/342 |
| 2008/0294960 | A1* | 11/2008 | Sharon et al. | 714/752 |
| 2011/0189950 | A1* | 8/2011 | Noh et al. | 455/39 |
| 2011/0231731 | A1* | 9/2011 | Gross et al. | 714/760 |
| 2013/0072131 | A1* | 3/2013 | Guey et al. | 455/68 |

OTHER PUBLICATIONS

Jian Ni and Sekhar Tatikonda, "Performance Evaluation of Loss Networks via Factor Graphs and the Sum-Product Algorithm", 2007, IEEE Infocom 2007 Proceedings, pp. 409-417.*

Jian Ni and Sekhar Tatikonda, "Performance Evaluation of Loss Networks via Factor Graphs and the Sum-Product Algorithm", IEEE Infocom 2007 Proceedings, pp. 409-417.*

Frank R. Kschischang, Brendan J. Frey and Hans-Andrea Loeliger, "Factor Graphs and the Sum-Product Algorithm", IEEE Transactions on Information Theory, vol. 47, No. 2, Feb. 2001, pp. 498-519.*

Kschischang, F. et al., Factor graphs and the sum-product algorithm, IEEE Transactions on Information Theory, vol. 47, Feb. 2001, pp. 498-519.

NG, B. et al., "Distributed Downlink Beamforming with Cooperative Base Stations", IEEE Transactions on Information Theory, vol. 54, Issue 12, Dec. 2008, pp. 5491-5499.

Sohn, I. et al., "A Graphical Model Approach to Downlink Cooperative MIMO Systems", Global Telecommunications Conference 2010, Dec. 2010, pp. 1-5.

(Continued)

*Primary Examiner* — Andrew Lai
*Assistant Examiner* — Sumitra Ganguly
(74) *Attorney, Agent, or Firm* — Withrow & Terranova, PLLC (57) ABSTRACT

Systems and method are disclosed for graph-based distributed parameter coordination in a communication network. In general, discrete local parameters to be coordinated among communication nodes in the network and their respective performance metrics, or costs, are modeled using a factor graph. Based on the factor graph, a variant of the sum-product algorithm, namely the min-sum algorithm, is applied in order for the communication nodes, through iterative message passing with their neighboring communication nodes, to decide upon optimal values for the local parameters for the communication nodes that collectively optimize a global performance metric across the communication network. In one embodiment, the communication network is a wireless communication network. In one specific embodiment, the wireless communication network is a cellular communication network.

43 Claims, 6 Drawing Sheets

(56) References Cited

OTHER PUBLICATIONS

Guerrieiro, I. et al., "A Graph-Based Approach for Distributed Parameter Coordination in Wireless Communication Networks", IEEE Globecome 2012 Workshop, Dec. 3, 2012, pp. 152-156, Anaheim, California.

Ni, J. et al., "Performance Evaluation of Loss Networks via Factor Graphs and the Sum-Product Algorithm", 26th IEEE International Conference on Computer Communications (INFOCOM 2007), May 1, 2007, pp. 409-417.

Zhang, G. et al., "Linear Coordinate-Descent Message-Passing for Quadratic Optimization", 2012 IEEE International Conference on Acoustics, Speech and Signal Processing (ICASSP 2012), Mar. 25-30, 2012, pp. 2005-2008, Kyoto, Japan.

International Search Report for PCT/IB2012/056810, mailed Mar. 22, 2013, 13 pages.

\* cited by examiner

SYSTEMS AND METHOD FOR GRAPH-BASED DISTRIBUTED PARAMETER COORDINATION IN A COMMUNICATION NETWORK

FIELD OF THE DISCLOSURE

The present disclosure relates to a communication network and more particularly relates to distributed parameter coordination in a communication network.

BACKGROUND

In a communication network, such as a cellular communication network, local parameter settings of one communication node oftentimes influence the selection of local parameters of neighboring communication nodes in the communication network. For instance, it is sometimes necessary for each base station in a cellular communication network to select a set of parameters that is uniquely distinguishable from those selected by its neighboring base stations (i.e., base stations that serve neighboring cells in the cellular communication network). Take downlink transmission for example, each base station needs to transmit a locally unique Reference Signal (RS) for User Equipments (UEs) to identify the base station and to synchronize to the downlink transmission from the base station. The set of available reference signals is limited, and each base station needs to select (or be assigned) a reference signal that is different from the reference signals of its neighboring base stations. As another example, each base station may select (or be assigned) one of several frequency bands for transmission. If the same frequency band is only reused by other base stations serving cells that are far away, inter-cell interference can be significantly reduced. This is the classical frequency planning commonly practiced in second generation networks such as Global System for Mobile Communications (GSM) networks. There are also occasions when each base station may need to set a value to a parameter, such as transmit power, in such a way that the setting is compatible with those of the neighboring base stations in order to achieve a certain notion of optimality of the entire cellular communication network. These are just some typical problems encountered in the design of a cellular communication network in which a local parameter setting influences and is influenced by the settings of the neighboring cells.

Some of these problems, such as RS and frequency reuse, are typically static in nature and can therefore be solved by advanced planning during the build out of the cellular communication network. Currently, the parameters are set by planning tools that have access to information such as base station locations and radio propagation characteristics. Once a solution that is optimal network-wise is found, it remains unchanged for a long time until the deployment changes. However, other problems, such as transmit power control, are more dynamic in nature and require more frequent updates as the channel conditions vary. Methods that allow base stations to dynamically adjust their choice of parameters are therefore quite desirable.

Recently, there have been new applications in which the setting of conventional long-term parameters, such as frequency and RS reuse, also needs to adapt to short term changes and there is no central controller to oversee the update of the parameters. For example, in device-to-device communication, the UE locations change over time. Moreover, arrival and departure of devices also alter the system topology, and thus neighboring relationships, dynamically at a very fast pace. If the same RS selection or frequency reuse setting is to be performed in such distributed network, a distributed mechanism must be employed.

As such, there is a need for systems and methods for distributed parameter coordination in a communication network, such as a cellular communication network.

SUMMARY

Systems and methods are disclosed for graph-based distributed parameter coordination in a communication network. In general, discrete local parameters to be coordinated among communication nodes in the communication network and their respective performance metrics, or costs, are modeled using a factor graph. Based on the factor graph, a variant of the sum-product algorithm, namely the min-sum algorithm, is applied in order for the communication nodes, through iterative message passing with their neighboring communication nodes, to decide upon optimal values for the local parameters for the communication nodes that collectively optimize a global performance metric across the communication network. In one embodiment, the communication network is a wireless communication network. In one specific embodiment, the wireless communication network is a cellular communication network.

In one embodiment, a communication node in a communication network iteratively exchanges messages with neighboring communication nodes of the communication node in the communication network based on a factor graph until a predefined stopping criteria is satisfied. The factor graph models discrete local parameters to be coordinated among communication nodes in the communication network and corresponding performance metrics of the communication nodes. In one embodiment, the messages are exchanged according to a min-sum algorithm. Based on results of iteratively exchanging the messages with its neighboring communication nodes, the communication node computes an optimal value for the local parameter of the communication node based on results of iteratively exchanging the messages with the plurality of neighboring communication nodes. The optimal value for the local parameter of the communication node and corresponding optimal values determined for local parameters of other communication nodes in the communication network together optimize a global performance metric for the communication network.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
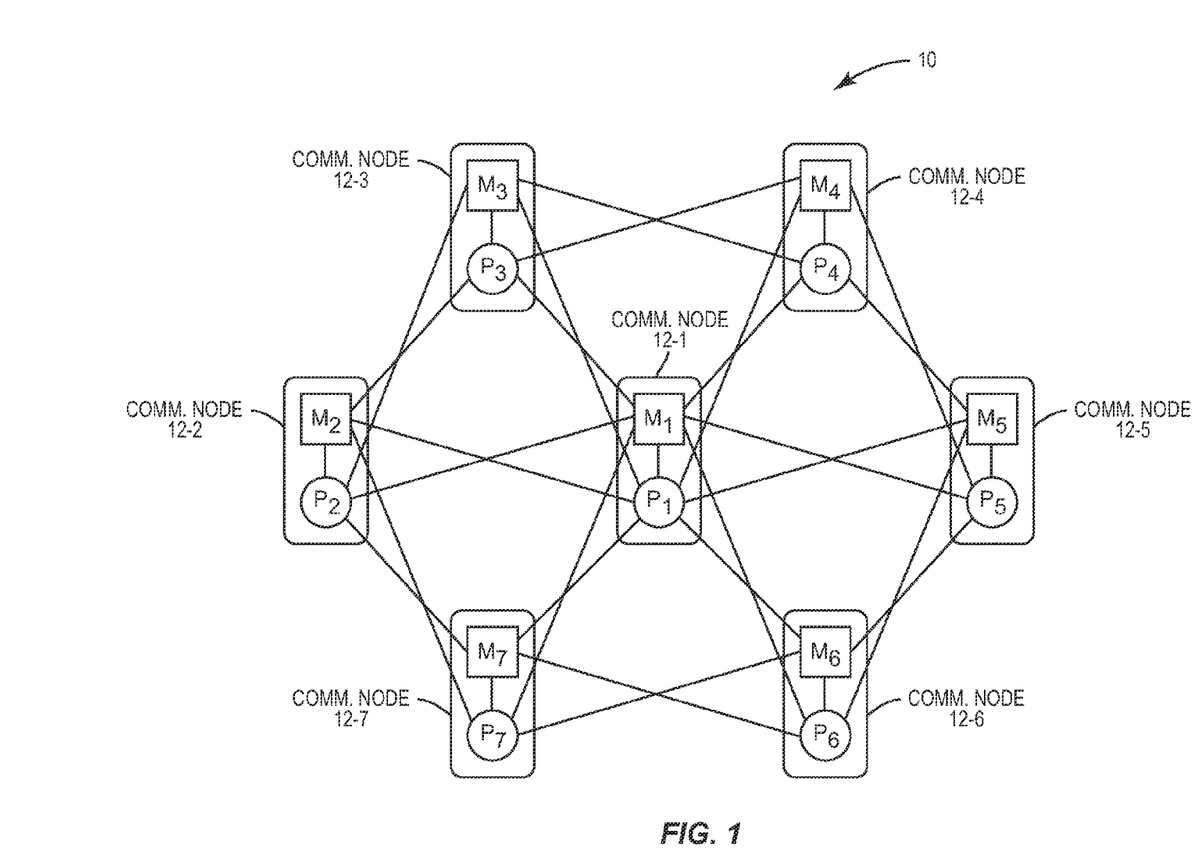
FIG. 1 illustrates a cellular communication network where discrete local parameters to be coordinated among communication nodes in the cellular communication network and their respective performance metrics, or costs, are modeled using a factor graph according to one embodiment of the present disclosure.

FIG. 1 illustrates a cellular communication network 10 incorporating systems and methods for distributed parameter coordination according to one embodiment of the present disclosure. Before proceeding, it should be noted that while this disclosure focuses on the cellular communication network 10, the concepts described herein are equally applicable to wired communication networks and other types of wireless communication networks (e.g., WiFi networks). As illustrated, the cellular communication network 10 includes a number of communication nodes 12-1 through 12-7, which are generally referred to herein as communication nodes 12 or individually as communication node 12. The communication nodes 12 may be base stations in the cellular communication network 10, user equipments (UEs), or mobile stations in the cellular communication network 10, or the like. As used herein, the term "base station" refers to a Node B, enhanced Node B (eNodeB), or other suitable type of base station in a cellular communication network such as the cellular communication network 10, whereas the term "access node" is a more general term that refers to an access node in any type of wireless communication network (e.g., an access node in a WiFi network or a base station in a cellular communication network). Note that while only seven communication nodes 12 are illustrated for clarity and ease of discussion, it should be appreciated that the cellular communication network 10 may include any number of communication nodes 12.

Considering the cellular communication network 10 with N communication nodes 12, let $p_i$, for $i=1, 2, \ldots, N$, denote a discrete local parameter of the i-th communication node 12 (referred to as communication node i) whose value is drawn from a finite set $\mathcal{P}_i$ of possible parameter values for the i-th communication node i. Also, let $p=[p_1, p_2, \ldots, p_N]^T$ be a vector collecting the local parameters of all of the communication nodes 12 in the cellular communication network 10. Each communication node i is associated with a list $\mathcal{N}_i$ of "proper" neighboring communication nodes (i.e., excluding communication node i) whose choices of parameter values can affect the local performance of communication node i. For convenience, also let $\mathcal{A}_i = \mathcal{N}_i \cup \{i\}$ denote the "inclusive" neighbor list of communication node i. Let $\mathbf{p}_{\mathcal{A}_i}$ denote the vector of those parameters of nodes in $\mathcal{A}_i$, with its ordering of parameters determined by the sorted indices in $\mathcal{A}_i$. Associated with each communication node i is a performance metric or cost, denoted by $M_i(\mathbf{p}_{\mathcal{A}_i})$, which is a function of those parameters in the inclusive neighbor list $\mathcal{A}_i$ of communication node i. Each communication node i is assumed to be capable of communicating with all communication nodes 12 in $\mathcal{A}_i$. The goal is for each communication node i to find, in a distributed fashion, its own optimal parameter $p_i^*$, which is the corresponding component of the optimal global parameter vector $p^*$ that minimizes a weighted global performance metric given by:

$$M(p) = \sum_{i=1}^{N} w_i M_i(p_{\mathcal{A}_i}), \quad (1)$$

where $w_i$ denotes a weight associated with the local performance metric $M_i(\mathbf{p}_{\mathcal{A}_i})$.

The present disclosure provides systems and methods for solving the problem above by modeling the communication nodes 12 and the associated local performance metrics using a factor graph. A factor graph is a bipartite graph consisting of a set of variable nodes and a set of factor nodes. Each variable node represents a variable and can only be connected to a factor node, but not another variable node. Each factor node represents a function of some of the variables. A factor node is connected to a variable node if and only if the corresponding function represented by the factor node depends on that variable.

For the cellular communication network 10, the local parameters (p) of the communication nodes 12 are represented as variable nodes $v(p_1)$ through $v(p_7)$, and the local metrics (M) of the communication nodes 12 are represented as factor nodes $v(M_1)$ through $v(M_7)$. More specifically, each communication node i is modeled by a variable node that represents the local parameter $p_i$ of the communication node i and a factor node that represents the local metric $M_i(\mathbf{p}_{\mathcal{A}_i})$ of the communication node i. Accordingly, a variable node corresponding to $p_i$ is labeled as $v(p_i)$, and a factor node corresponding to $M_i(\mathbf{p}_{\mathcal{A}_i})$ is labeled as $v(M_i)$. An edge connecting a factor node $(M_i)$ with variable node $v(p_k)$ exists if and only if $k \in \mathcal{A}_i$. For example, FIG. 1 shows a hexagonal layout of seven communication nodes 12-1 through 12-7, each associated with a factor node representing the local performance metric $M_i(\mathbf{p}_{\mathcal{A}_i})$ and a variable node representing the local parameter $p_i$. The factor node associated with the local performance metric $M_i(\mathbf{p}_{\mathcal{A}_i})$ of communication node i is connected through edges to the respective variable nodes associated with its own local parameter $p_i$ and those parameters $\{p_i\}_{i \in \mathcal{N}_i}$ of its neighboring communication nodes 12 upon which the metric $M_i(\mathbf{p}_{\mathcal{A}_i})$ depends.

Figure 2:
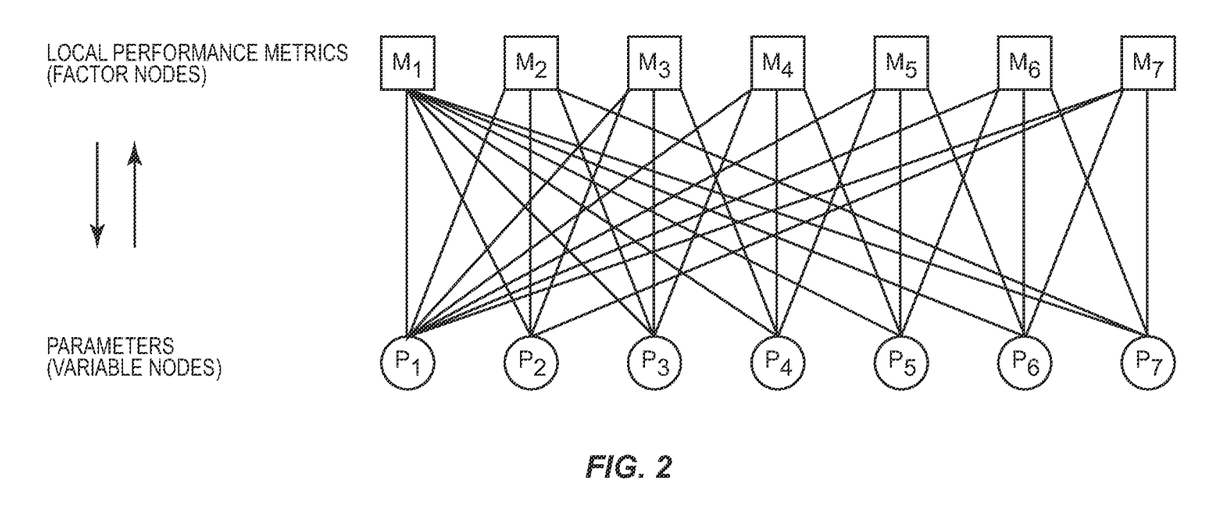
FIG. 2 is a re-organized factor graph for the cellular communication network of FIG. 1 that illustrates relationships between factor nodes that represent local performance metrics of the communication nodes and variable nodes that represent the local parameters of the communication nodes according to one embodiment of the present disclosure.

FIG. 2 is a re-organized factor graph for the cellular communication network 10 of FIG. 1. The re-organized factor graph clearly shows the bipartite property of the factor graph with factor nodes connected only to variable nodes through respective edges. As discussed below, a message passing algorithm is executed based on the factor graph in order to perform distributed coordination of the local parameters (p) of the communication nodes 12 to collectively optimize the global performance metric for the cellular communication network 10. The message passing algorithm is preferably a min-sum algorithm. Those messages that are passed on edges connecting factor and variable nodes for different communication nodes (e.g., communication nodes 12-1 and 12-2) correspond to information exchanged between two neighboring communication nodes 12, while those messages that are passed on edges that connect factor and variable nodes for the same communication node (e.g., communication node 12-1) represent internal communications within those communication nodes 12. Each message depends only on the variable whose associated variable node is a vertex of the edge over which the message is passed along. More precisely, each message is simply a table of values with each entry corresponding to one of the possible values of the variable, as described in more detail below.

The sum-product algorithm can be applied whenever the variables and functions associated with the factor graph are defined on a commutative semiring whose elements satisfy the distributive law. For our problem at hand, a variant of the sum-product algorithm is applied that is based on the min-sum commutative semiring. In this case, the sum-product algorithm is also called the min-sum algorithm. Recall that a semiring is a mathematical structure equivalent to a ring without an additive inverse. A min-sum semiring simply replaces the addition operation with the minimum operation and the multiplication operation with the addition operation.

More specifically, let $\mu_{M_i \to p_k}(p_k)$ denote a message, referred to herein as a summary message, to be passed from a factor node $v(M_i)$ to a variable node $v(p_k)$, and let $\mu_{p_k \to M_i}(p_k)$ denote a message, referred to herein as an aggregate message, to be passed from the variable node $v(p_k)$ to the factor node $v(M_i)$. The min-sum algorithm, when applied to our problem at hand, simply iterates between the following two kinds of message computations and exchanges:

$$\mu_{M_i \to p_k}(p_k) = \min_{p_{\mathcal{A}_i \setminus \{k\}}} \left\{ w_i M_i(p_{\mathcal{A}_i}) + \sum_{j \in \mathcal{A}_i \setminus \{k\}} \mu_{p_j \to M_i}(p_j) \right\}, \quad (2)$$

$$\mu_{p_k \to M_i}(p_k) = \sum_{j \in \mathcal{A}_k \setminus \{i\}} \mu_{M_j \to p_k}(p_k). \quad (3)$$

Note that both messages computed in Equations (2) and (3) depend only on the value of $p_k$. Since $p_k \in \mathcal{P}_k$ and $\mathcal{P}_k$ is assumed to be discrete and finite, each of the messages can be represented by a table of $|\mathcal{P}_k|$ entries, where $|\mathcal{P}_k|$ denotes the cardinality of $\mathcal{P}_k$. In Equation (2), the summary message $\mu_{M_i \to p_k}(p_k)$ is a table of $|\mathcal{P}_k|$ values, where each value in the summary message is a minimum value determined from Equation (2) for a corresponding one of the possible values $\mathcal{P}_k$ for $p_k$. In Equation (3), the aggregate message $\mu_{p_k \to M_i}(p_k)$ is a table of $|\mathcal{P}_k|$ values, where each value in the aggregate message is a summation of the values from the summary messages $\mu_{M_j \to p_k}(p_k)$ received from communication nodes $j \in \mathcal{A}_k \setminus \{i\}$ (i.e., the neighboring communication nodes 12 in the inclusive list of neighboring communication nodes for the communication node k other than the communication node i for which the aggregate message is generated).

The min-sum algorithm may begin with each factor node $v(M_i)$ computing an outgoing summary message $\mu_{M_i \to p_k}(p_k)$ to $v(p_k)$ for each $k \in \mathcal{A}_i$ using Equation (2) with all aggregate messages $\mu_{p_k \to M_i}(p_k)$ from connected variable nodes initialized to certain predetermined values. Upon receipt of the summary message $\mu_{M_i \to p_k}(p_k)$, each variable node $v(p_k)$ then computes a summary message $u_{p_k \to M_i}(p_k)$ to $v(M_i)$ for each $i \in \mathcal{A}_k$. The algorithm then iterates until certain stopping criteria, such as a pre-determined maximum number of iterations, is reached, in which case the optimal value for the local parameter for communication node i is determined at its variable node $v(p_i)$ by:

$$p_i^* = \operatorname*{argmin}_{p_i} \left\{ \sum_{j \in \mathcal{A}_i} \mu_{M_j \to p_i}(p_i) \right\}. \quad (4)$$

When the factor graph contains no cycle, the message passing algorithm described above will yield the exact optimal solution that minimizes the global performance metric (Equation (1)). However, when the factor graph contains cycle, as it often does in many practical applications such as the problem of interest, Equation (4) yields a good approximation to the true optimal solution.

Figure 3:
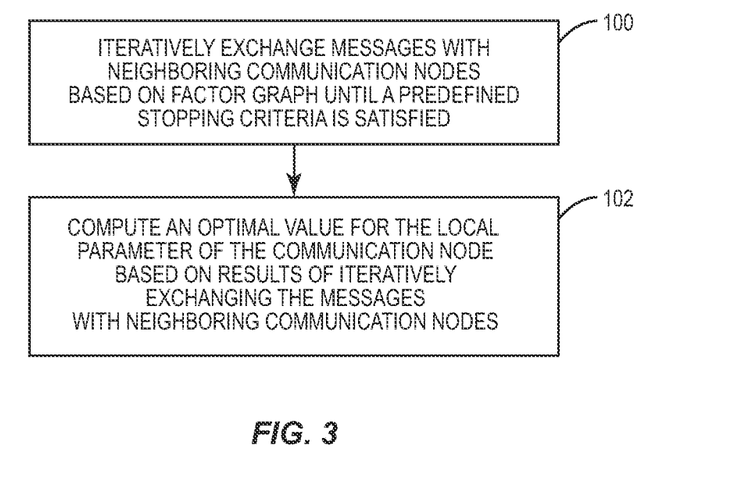
FIG. 3 is a flow chart illustrating the operation of each of the communication nodes to, based on the factor graph modeling the communication nodes in the cellular communication network, iteratively exchange messages with its neighboring communication nodes to determine an optimal value for its local parameter that together with similarly determined optimal parameters for the other communication nodes in the cellular communication network collectively optimize a global performance metric across the cellular communication network according to one embodiment of the present disclosure.

FIG. 3 is a flow chart illustrating the operation of one of the communication nodes 12 according to one embodiment of the present disclosure. Note that FIG. 3 is equally applicable to the other communication nodes 12 in the cellular communication network 10 such that, based on the factor graph modeling the communication nodes 12 in the cellular communication network 10, the communication nodes 12 iteratively exchange messages with their neighboring communication nodes to determine optimal values for their local parameters that collectively optimize the global performance metric across the cellular communication network 10 according to one embodiment of the present disclosure.

As illustrated, the communication node 12 iteratively exchanges messages with the neighboring communication nodes 12 based on the factor graph until a predefined stopping criteria is satisfied (step 100). In the preferred embodiment, the messages are summary messages and aggregate messages generated according to Equations (2) and (3) above. The stopping criteria may be, for example, a predefined maximum number of iterations. However, other stopping criteria may alternatively be used. For example, the stopping criteria may be that the maximum percentage change in all the summary messages received by a variable node after an iteration is less than a certain predetermined threshold. It should also be noted that the communication node 12 may iteratively exchange the messages with the neighboring communication nodes 12 according to a predefined schedule. The predefined schedule may be defined such that convergence of the min-sum algorithm is improved. For example, the predefined schedule may be such that on average, 90% of the communication nodes 12 are randomly selected to generate and exchange the messages in each iteration of the min-sum algorithm (i.e., only 90% of the communication nodes 12 participate when averaged over many iterations; some iterations may have more while some iterations may have less). Conversely, the predefined schedule may be such that on average, 10% of the communication nodes 12 are randomly selected to not participate in each iteration. The random selection process may be carried out by independently generating a pseudo random number at each node and comparing it against a threshold predetermined according to the desired fraction of communications nodes that participate in each iteration. Once the predefined stopping criteria is satisfied, the communication node 12 determines or otherwise computes the optimal value for the local parameter of the communication node 12 (step 102). In the preferred embodiment, the optimal value is computed according to Equation (4).

Figure 4:
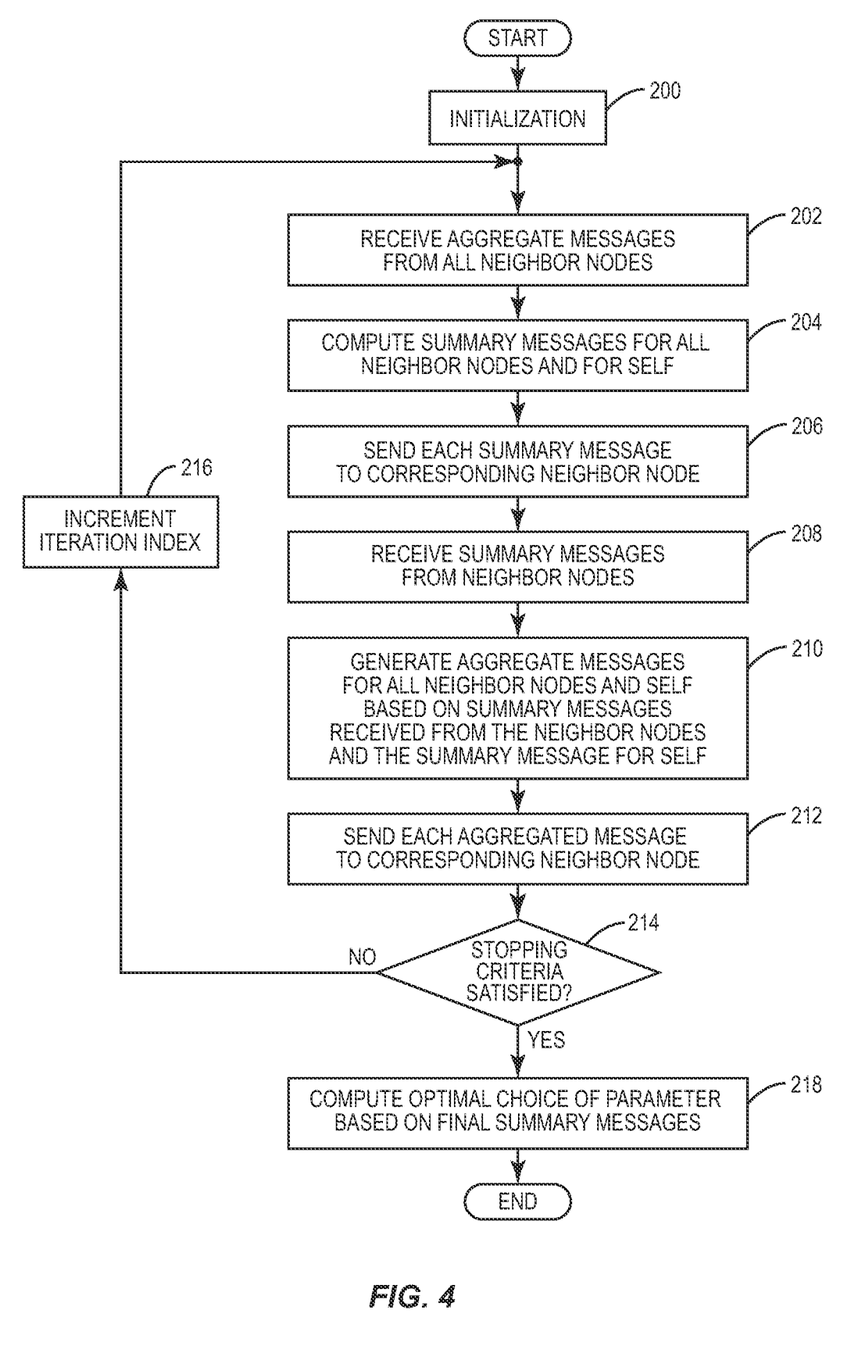
FIG. 4 is a more detailed embodiment of the flow chart of FIG. 3 according to one embodiment of the present disclosure.

FIG. 4 is a more detailed embodiment of the flow chart of FIG. 3 according to one embodiment of the present disclosure. Again, while this process is described with respect to one of the communication nodes 12, it should be understood that this process is performed by each of the communication nodes 12 in the cellular communication network 10 in order to determine the optimal values for the local parameters of the communication nodes 12 in a distributed, coordinated manner that optimizes the global performance metric of the cellular communication network 10.

First, the communication node 12 (which for the remaining discussion of FIG. 4 is referred to as communication node i) performs an initialization process (step 200). At this point, an iteration index (n) is set to zero (i.e., n=0). During the initialization process, the communication node i initializes an aggregate message of the communication node i ($\mu_{p_i \to M_k}^{(0)}(p_i)$) to an initial value, and sends the aggregate message to the neighboring communication nodes $k \in \mathcal{N}_i$. For example, the communication node i may set $\mu_{p_i \to M_k}^{(0)}(p_i)=0$ for some value of $p_i$ in $\mathcal{P}_i$ and set $\mu_{p_i \to M_k}^{(0)}(p_i)=\epsilon$ for all other values of $p_i$ in $\mathcal{P}_i$, for all $k \in \mathcal{A}_i$, to indicate initial preference of communication node i, where $\epsilon$ denotes a small positive number such as 0.01. Next, the communication node i receives the aggregate messages from all of the neighboring communication nodes $k \in \mathcal{N}_i$ of the communication node i (step 202). Specifically, the aggregate messages are received from the variable nodes $v(p_k)$ of all of the neighboring communication nodes $k \in \mathcal{N}_i$ of the communication node i.

The communication node i, and specifically the factor node of the communication node i, then computes summary messages for each of the neighboring communication nodes $k \in \mathcal{N}_i$ of the communication node i and a summary message for the communication node i itself (step 204). More specifically, the summary messages are computed based on Equation (2) above. Specifically, the summary messages are computed based on:

$$\mu_{M_i \to p_k}^{(n+1)}(p_k) = \min_{P_{\mathcal{A}_i \setminus \{k\}}} \left\{ \begin{array}{l} w_i M_i(p_{\mathcal{A}_i}) + \mu_{p_i \to M_i}^{(n)}(p_i) + \\ \sum_{j \in N_i \setminus \{k\}} \mu_{p_j \to M_i}^{(n)}(p_j) \end{array} \right\} \qquad (5)$$

$$= \min_{P_{\mathcal{A}_i \setminus \{k\}}} \left\{ \begin{array}{l} w_i M_i(p_{\mathcal{A}_i}) + \mu_{p_i \to M_i}^{(n)}(p_i) - \mu_{p_k \to M_i}^{(n)}(p_k) + \\ \sum_{j \in N_i} \mu_{p_j \to M_i}^{(n)}(p_j) \end{array} \right\}$$

for each neighboring communication node $k \in \mathcal{A}_i$, by hypothesizing each possible value of $p_k$ in $\mathcal{P}_k$ and finding the best corresponding set of parameters $\mathbf{P}_{\mathcal{A}_i \setminus \{k\}}$ that minimizes the quantity in brackets above.

More specifically, in order to understand Equation (5), one must first understand that $M_i(\mathbf{P}_{\mathcal{A}_i})$ is essentially a multi-dimensional table that includes a value for the local performance metric for communication node i for each possible combination of values for vector $\mathbf{P}_{\mathcal{A}_i}$, which is a vector of the local performance metrics of the inclusive list of neighboring communication nodes for communication node i. Then, in order to compute the summary message to be sent to communication node k, the communication node i first hypothesizes that $p_k$ is one of the possible values in $\mathcal{P}_k$. Then, using the hypothesized value for $p_k$, $M_i(\mathbf{P}_{\mathcal{A}_i})$ becomes a multi-dimensional table for all possible combinations of values for $\mathbf{P}_{\mathcal{A}_i}$ with $p_k$ equal to the hypothesized value for $p_k$. Each value in the multi-dimensional table is then summed with a discrete value that is equal to a summation of the values from the aggregate message $\mu_{p_j \to M_i}^{(n)}(p_j)$ for $j \in \mathcal{A}_i \setminus \{k\}$ for the hypothesized value for $p_k$. A minimum value from the resulting multi-dimensional table is then determined. A value in the summary message $\mu_{M_i \to p_k}^{(n+1)}(p_k)$ corresponding to the hypothesized value for $p_k$ is then set equal to the minimum value determined for the hypothesized value for $p_k$. This process is repeated for each of the other possible values $\mathcal{P}_k$ for $p_k$. In this manner, the summary messages $\mu_{M_i \to p_k}^{(n+1)}(p_k)$ are computed for all of the communication nodes $k \in \mathcal{A}_i$. Note that to reduce computational complexity, the minimization operation in step 204 can be computed through a standard alternating-coordinate optimization technique, i.e., starting with an arbitrary choice of $\mathbf{P}_{\mathcal{A}_i \setminus \{k\}}$ and optimizing each parameter in $\mathbf{P}_{\mathcal{A}_i \setminus \{k\}}$ one at a time while holding the other parameters fixed.

The communication node i then sends each of the summary messages $\mu_{M_i \to p_k}^{(n+1)}(p_k)$ for $k \in \mathcal{N}_i$ (i.e., the summary messages for the proper neighboring communication nodes of the communication node i) to the corresponding neighboring communication node k (step 206). The communication node i also receives similarly computed summary messages from the proper neighboring communication nodes 12 of the communication node i (step 208).

The communication node i then generates aggregate messages $\mu_{p_i \to M_k}^{(n+1)}(p_i)$ for $k \in \mathcal{N}_i$ (i.e., for each of the proper neighboring communication nodes 12 of the communication node i) as well as an aggregate message $\mu_{p_i \to M_k}^{(n+1)}(p_i)$ for $k=\{i\}$ (i.e., for the communication node i itself) (step 210). More specifically, the communication node i generates the aggregate messages according to Equation (3) above. More specifically, the communication node i generates the aggregate messages based on:

$$\mu_{p_i \to M_k}^{(n+1)}(p_i) = \mu_{M_i \to p_i}^{(n+1)}(p_i) + \sum_{j \in N_i \setminus \{k\}} \mu_{M_j \to p_i}^{(n+1)}(p_i) \qquad (6)$$

$$= \mu_{M_i \to p_i}^{(n+1)}(p_i) - \mu_{M_k \to p_i}^{(n+1)}(p_i) + \sum_{j \in N_i} \mu_{M_j \to p_i}^{(n+1)}(p_i)$$

for each neighbor communication node $k \in \mathcal{A}_i$ by summing the summary messages $\{\mu_{M_j \to p_i}^{(n+1)}(p_i)\}_{j \in \mathcal{N}_i}$.

The communication node i then sends each of the aggregate messages $\mu_{p_i \to M_k}^{(n+1)}(p_i)$ to the corresponding neighboring communication node k (step 212). In this embodiment, the communication node i next determines whether the predefined stopping criteria has been satisfied (step 214). If not, the iteration index is incremented (step 216), and the process returns to step 202 and is repeated. If the predefined stopping criteria has been satisfied, the communication node i computes an optimal value $p_i^*$ for the local parameter of the communication node i based on the summary messages from the final iteration (i.e., the final summary messages) (step 218). More specifically, the optimal value $p_i^*$ for the local parameter of the communication node i is computed based on:

$$p_i^* = \underset{p_i}{\operatorname{argmin}} \left\{ \sum_{j \in \mathcal{A}_i} \mu_{M_j \to p_i}^{(n_f)}(p_i) \right\}. \quad (7)$$

Equation (7) returns one of the possible values for the local parameter $p_i$ of the communication node i that corresponds to the minimum value in the table resulting from the summation of the final summary messages.

Figure 5:
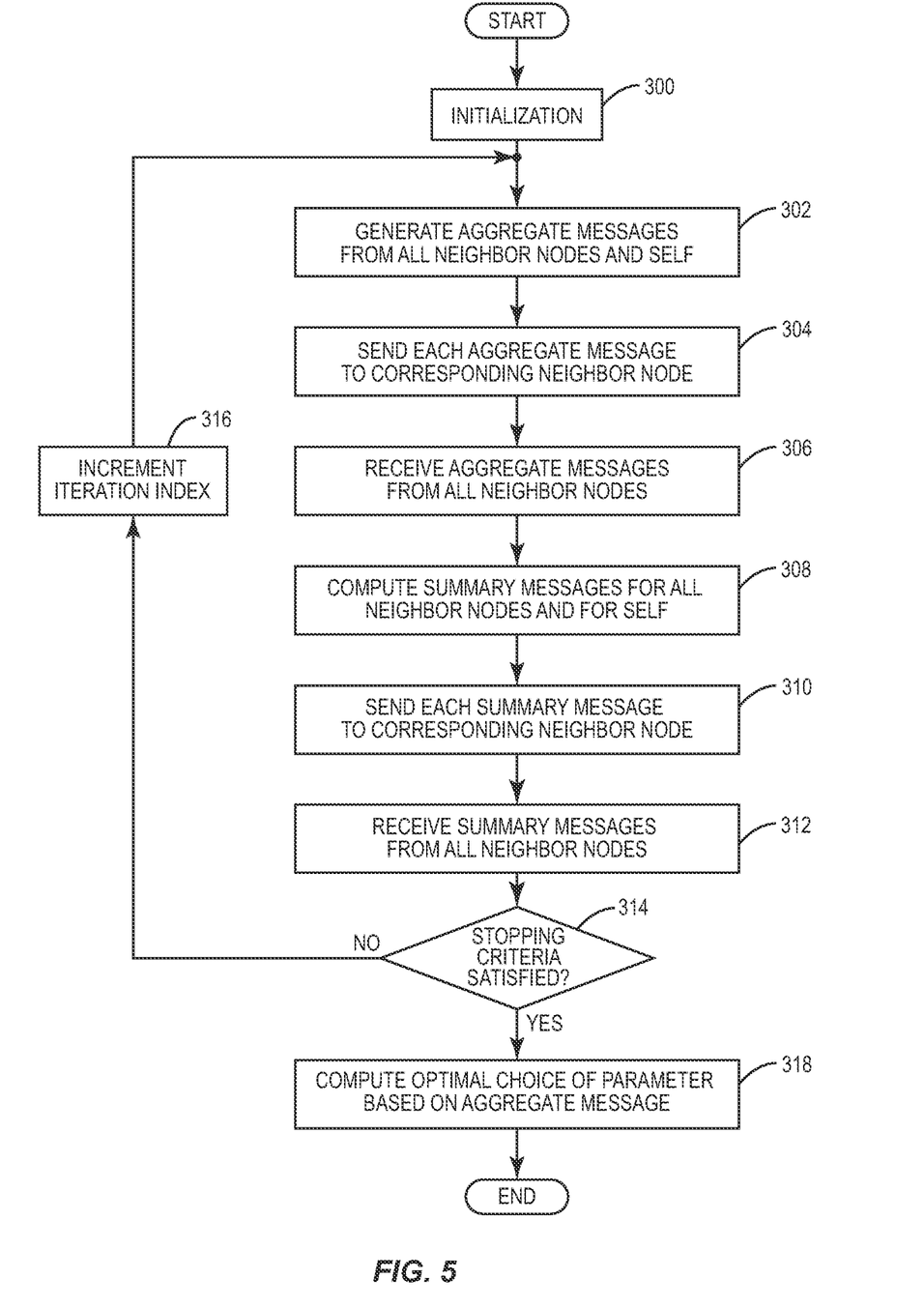
FIG. 5 is a more detailed embodiment of the flow chart of FIG. 3 according to another embodiment of the present disclosure.

FIG. 5 is a more detailed embodiment of the flow chart of FIG. 3 according to another embodiment of the present disclosure. Notably, FIG. 5 is substantially the same as FIG. 4 but where the stopping criteria is checked after sending and receiving summary messages rather than after generating and sending the aggregate messages as in FIG. 4. Again, while this process is described with respect to one of the communication nodes 12, it should be understood that this process is performed by each of the communication nodes 12 in the cellular communication network 10 in order to determine the optimal values for the local parameters of the communication nodes 12 in a distributed, coordinated manner that optimizes the global performance metric of the cellular communication network 10.

First, the communication node 12 (which for the remaining discussion of FIG. 4 is referred to as communication node i) performs an initialization process (step 300). At this point, an iteration index (n) is set to zero (i.e., n=0). During the initialization process, the communication node i initializes all messages to predetermined values. In particular, the communication node i initializes the summary messages from the communication node i for n=0 (i.e., $\mu_{M_i \to p_k}^{(0)}(p_k)$) for all $k \in \mathcal{A}_i$. In order to initialize the summary messages $\mu_{M_i \to p_k}^{(0)}(p_k)$ for the communication node i, the communication node i first initializes the aggregate messages $\mu_{p_i \to M_k}^{(0)}(p_i)$ from the communication node i for all $k \in \mathcal{A}_i$ to some predetermined initial values (e.g., 0 for some value of $p_i$ and $\epsilon = 0.01$ for all other values of $p_i$) and then sends the aggregate messages for $k \in \mathcal{N}_i$ to the corresponding neighboring communication nodes k. Likewise, the communication node i then receives aggregate messages from its neighboring communication nodes k for $k \in \mathcal{N}_i$. The communication node i then computes the summary messages $\mu_{M_i \to p_k}^{(0)}(p_k)$ for all $k \in \mathcal{A}_i$ for n=0 using:

$$\mu_{M_i \to p_k}^{(0)}(p_k) = \min_{p_{\mathcal{A}_i \setminus \{k\}}} \left\{ w_i M_i(p_{\mathcal{A}_i}) + \mu_{p_i \to M_i}^{(0)}(p_i) + \sum_{j \in N_i \setminus \{k\}} \mu_{p_j \to M_i}^{(0)}(p_j) \right\} \quad (8)$$

$$= \min_{p_{\mathcal{A}_i \setminus \{k\}}} \left\{ w_i M_i(p_{\mathcal{A}_i}) + \mu_{p_i \to M_i}^{(0)}(p_i) - \mu_{p_k \to M_i}^{(0)}(p_k) + \sum_{j \in N_i} \mu_{p_j \to M_i}^{(0)}(p_j) \right\}.$$

The communication node i then generates aggregate messages $\mu_{p_i \to M_k}^{(n+1)}(p_i)$ for $k \in \mathcal{N}_i$ (i.e., for each of the proper neighboring communication nodes 12 of the communication node i) as well as an aggregate message $\mu_{p_i \to M_k}^{(n+1)}(p_i)$ for $k=\{i\}$ (i.e., for the communication node i itself) (step 302). More specifically, the communication node i generates the aggregate messages according to Equation (3) above. More specifically, the communication node i generates the aggregate messages based on:

$$\mu_{p_i \to M_k}^{(n+1)}(p_i) = \mu_{M_i \to p_i}^{(n+1)}(p_i) + \sum_{j \in N_i \setminus \{k\}} \mu_{M_j \to p_i}^{(n+1)}(p_i) \quad (9)$$

$$= \mu_{M_i \to p_i}^{(n+1)}(p_i) - \mu_{M_k \to p_i}^{(n+1)}(p_i) + \sum_{j \in N_i} \mu_{M_j \to p_i}^{(n+1)}(p_i)$$

for each neighboring communication node $k \in \mathcal{A}_i$ by summing the summation messages $\{\mu_{M_j \to p_i}^{(n+1)}(p_i)\}_{j \in \mathcal{N}_i}$.

The communication node i then sends each of the aggregate messages $\mu_{p_i \to M_k}^{(n+1)}(p_i)$ to the corresponding neighboring communication node k (step 304). In this embodiment, next, the communication node i receives the aggregate messages from all of the neighboring communication nodes $k \in \mathcal{N}_i$ of the communication node i (step 306). Specifically, the aggregate messages are received from the variable nodes $v(p_k)$ of all of the neighboring communication nodes $k \in \mathcal{N}_i$ of the communication node i.

The communication node i, and specifically the factor node of the communication node i, then computes summary messages for each of the neighboring communication nodes $k \in \mathcal{N}_i$ of the communication node i and a summary message for the communication node i itself (step 308). More specifically, the summary messages are computed based on Equation (2) above. Specifically, the summary messages are computed based on:

$$\mu_{M_i \to p_k}^{(n+1)}(p_k) = \min_{p_{\mathcal{A}_i \setminus \{k\}}} \left\{ w_i M_i(p_{\mathcal{A}_i}) + \mu_{p_i \to M_i}^{(n)}(p_i) + \sum_{j \in N_i \setminus \{k\}} \mu_{p_j \to M_i}^{(n)}(p_j) \right\} \quad (10)$$

$$= \min_{p_{\mathcal{A}_i \setminus \{k\}}} \left\{ w_i M_i(p_{\mathcal{A}_i}) + \mu_{p_i \to M_i}^{(n)}(p_i) - \mu_{p_k \to M_i}^{(n)}(p_k) + \sum_{j \in N_i} \mu_{p_j \to M_i}^{(n)}(p_j) \right\}$$

for each neighboring communication node $k \in \mathcal{A}_i$, by hypothesizing each possible value of $p_k$ in $\mathcal{P}_k$ and finding the best corresponding set of parameters $\mathbf{P}_{\mathcal{A}_i \setminus \{k\}}$ that minimizes the quantity in brackets above, as discussed above with respect to step 204 of FIG. 4.

The communication node i then sends each of the summary messages $\mu_{M_i \to p_k}^{(n+1)}(p_k)$ for $k \in \mathcal{N}_i$ (i.e., the summary messages for the proper neighboring communication nodes of the communication node i) to the corresponding neighboring communication node k (step 310). The communication node i also receives similarly computed summary messages from the proper neighboring communication nodes 12 of the communication node i (step 312).

Next, in this embodiment, the communication node i determines whether the predefined stopping criteria has been satisfied (step 314). If not, the iteration index is incremented (step 316), and the process returns to step 302 and is repeated. If the predefined stopping criteria has been satisfied, the communication node i computes an optimal value $p_i^*$ for the local parameter of the communication node i based on the summary messages from the final iteration (i.e., the final summary messages) (step 318). More specifically, the optimal value $p_i^*$ for the local parameter of the communication node i is computed based on:

$$p_i^* = \operatorname*{argmin}_{p_i} \left\{ \sum_{j \in \mathcal{A}_i} \mu_{M_j \to p_i}^{(n_f)}(p_i) \right\}. \quad (11)$$

Equation (11) returns one of the possible values for the local parameter $p_i$ of the communication node i that corresponds to the minimum value in the table resulting from the summation of the final summary messages.

While numerous applications of the systems and methods described herein will be appreciated by those of ordinary skill in the art, the following is a description of several exemplary applications. As a first example, each local parameter $p_i$ may represent an index to a frequency band out of a set $\mathcal{P}_i$ of all possible frequency bands for the communication node i, and the global performance metric is defined to solve the frequency reuse planning problem. More specifically, the global performance metric is defined such that the min-sum algorithm minimizes the number of "collisions" in using the same frequency band in adjacent cells or base stations. In this case, the local performance metric may be chosen as:

$$M_i(p_{\mathcal{A}_i}) = \sum_{j \in N_i} \delta(p_i, p_j),$$

where $\delta(x, y)=1$ if $x=y$, and otherwise $\delta(x, y)=0$. Another possible choice of the local performance metric that often leads to fast convergence is:

$$M_i(p_{\mathcal{A}_i}) = \sum_{j \in N_i} \delta(p_i, p_j) + \sum_{\substack{k,l \in N_i \\ k \in (\cup_{m \in N_l} N_m) \setminus \mathcal{A}_k \\ l \in (\cup_{m \in N_k} N_m) \setminus \mathcal{A}_l}} (1 - \delta(p_k, p_l)),$$

where the second term encourages second-tier neighboring communication nodes to select the same frequency band. Yet another possible choice of the local performance metric is $$M_i(p_{\mathcal{A}_i}) = \frac{1}{2} \sum_{\substack{j,k \in \mathcal{A}_i \\ k \in N_j}} \delta(p_k, p_j)$$

which counts all "collisions" between neighboring communication nodes within the neighborhood defined by $\mathcal{A}_i$.

As a second example, each parameter $p_i$ may represent an index to a reference signal (RS) out of a set $\mathcal{P}_i$ of all possible RSs for the communication node i. Here, the communication nodes 12 are access nodes in the cellular communication network 10, and the goal is to find the best combinations of RSs for all access nodes so that the sum of maximum cross-correlation between RSs in adjacent cells or access nodes is minimized. In this case the local performance metric may be chosen as:

$$M_i(p_{\mathcal{A}_i}) = \sum_{j \in N_i} \max_{|\tau| \leq L_{max}} |R_{s(p_i)s(p_j)}(\tau)|,$$

where $s(p_i)$ denotes the RS indexed by $p_i$, $L_{max}$ denotes the maximum correlation lag of interest which may be determined by the maximum allowable channel delay spread in the network, and $$R_{s_1 s_2}(\tau) \equiv \frac{1}{N_s} \sum_m s_1(m) s_2^*(m - \tau)$$

denotes the cross-correlation function among RS $s_1$ and RS $s_2$, where $N_s$ is the length of each RS. Note that if the set $\mathcal{P}_i$ contains a sufficient number of orthogonal RSs, the minimum achievable local performance metric is zero for all access nodes.

As a third example, each parameter $p_i$ may represent an index to power levels out of a set $\mathcal{P}_i$ of all possible power levels for the communication node i. The goal here is to find the best combinations of power levels for all communication nodes 12 (e.g., access nodes) so that the negative sum data throughput is minimized (or equivalently, the sum data throughput is maximized). In this case the local performance metric may be chosen as:

$$M_i(p_{\mathcal{A}_i}) = \log_2\left(1 + \frac{p_i}{\sum_{j \in N_i} p_j + \sigma_i^2}\right),$$

where $\sigma_i^2$ denotes the noise variance observed by the UE served by the i-th access node.

It should be noted that the process of FIGS. 3 through 5 are scalable to arbitrarily large networks since their computational complexity and communication overhead increase only with the maximum number of neighboring communication nodes instead of the total number of communication nodes 12 in the cellular communication network 10. Thus, the processes of FIGS. 3 through 5 are general, scalable processes for coordinating local parameters throughout the cellular communication network 10 in a distributed manner and have a wide range of potential applications in wireless communications including device-to-device communications and self-organizing networks.

Figure 6:
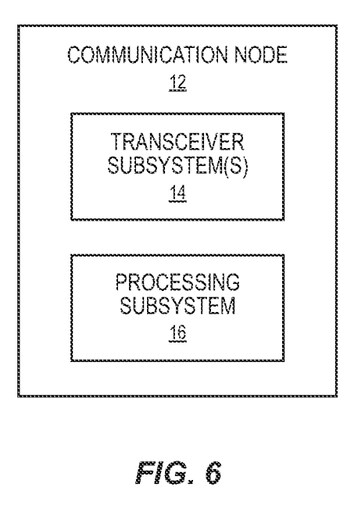
FIG. 6 is a block diagram of an exemplary communication node.

FIG. 6 is a block diagram of one of the communication nodes 12 according to one embodiment of the present disclosure. This discussion is equally applicable to all of the communication nodes 12. The communication node 12 includes one or more transceiver subsystems 14 and a processing subsystem 16. At least one of the transceiver subsystems 14 generally includes analog and, in some embodiments, digital components for sending and receiving messages (e.g., summary and aggregate messages) to and from the other communication nodes 12. In particular embodiments, the transceiver subsystems 14 may represent or include radio-frequency (RF) transceivers, or separate RF transmitters and receivers, capable of transmitting such messages and/or other suitable information wirelessly to other components.

The processing subsystem 16 generally operates to receive and send messages via the one or more transceiver subsystems 14 and to generate and process messages as described herein. Specifically, the processing subsystem 16 operates to compute summary messages and aggregate messages as described herein.

In particular embodiments, the processing subsystem 16 may comprise, for example, one or several general-purpose or special-purpose microprocessors or other microcontrollers programmed with suitable software and/or firmware to carry out some or all of the functionality of the communication node 12 described herein. In addition or alternatively, the processing subsystem 16 may comprise various digital hardware blocks (e.g., one or more Application Specific Integrated Circuits (ASICs), one or more off-the-shelf digital and analog hardware components, or a combination thereof) configured to carry out some or all of the functionality of the communication node 12 described herein. Additionally, in particular embodiments, the above described functionality of the communication node 12 may be implemented, in whole or in part, by the processing subsystem 16 executing software or other instructions stored on a non-transitory computer-readable medium, such as Random Access Memory (RAM), Read Only Memory (ROM), a magnetic storage device, an optical storage device, or any other suitable type of data storage components.

The following acronyms are used throughout this disclosure.

ASIC Application Specific Integrated Circuit
GSM Global System for Mobile Communications
RS Reference Signal
UE User Equipment Those skilled in the art will recognize improvements and modifications to the preferred embodiments of the present disclosure. All such improvements and modifications are considered within the scope of the concepts disclosed herein and the claims that follow.

What is claimed is:

1. A method of operation of a communication node in a communication network, comprising:
    iteratively exchanging messages with a plurality of neighboring communication nodes in the communication network based on a factor graph until a predefined stopping criteria is satisfied, the factor graph modeling discrete local parameters to be coordinated among communication nodes in the communication network and corresponding performance metrics of the communication nodes; and
    computing an optimal value for the local parameter of the communication node based on results of iteratively exchanging the messages with the plurality of neighboring communication nodes.

2. The method of claim 1 wherein computing the optimal value for the local parameter of the communication node comprises computing the optimal value for the local parameter of the communication node such that the optimal value for the local parameter and corresponding optimal values determined for local parameters of other communication nodes in the communication network together optimize a global performance metric for the communication network.

3. The method of claim 2 wherein the communication network is a wireless communication network.

4. The method of claim 3 wherein the wireless communication network is a cellular communication network.

5. The method of claim 2 wherein iteratively exchanging the messages with the plurality of neighboring communication nodes comprises iteratively exchanging the messages with the plurality of neighboring communication nodes according to a min-sum algorithm that minimizes the global performance metric for the communication network.

6. The method of claim 5 wherein the communication network is a wireless communication network, the communication nodes in the wireless communication network are access nodes, and the global performance metric represents a number of collisions in frequency between at least one of a group consisting of: frequencies used by neighboring access nodes or frequencies used in cells served by neighboring access nodes.

7. The method of claim 6 wherein the wireless communication network is a cellular communication network, and the access nodes are base stations in the cellular communication network.

8. The method of claim 5 wherein the communication network is a wireless communication network, the communication nodes in the wireless communication network are access nodes, and the global performance metric represents a cross-correlation between at least one of a group consisting of: reference signals used by neighboring access nodes or reference signals used in cells served by neighboring access nodes.

9. The method of claim 8 wherein the wireless communication network is a cellular communication network, and the access nodes are base stations in the cellular communication network.

10. The method of claim 5 wherein the communication network is a wireless communication network, the communication nodes in the wireless communication network are access nodes, and the global performance metric represents a negative sum data throughput for neighboring access nodes.

11. The method of claim 10 wherein the wireless communication network is a cellular communication network, and the access nodes are base stations in the cellular communication network.

12. The method of claim 5 wherein iteratively exchanging the messages comprises iteratively exchanging summary messages and aggregate messages according to the min-sum algorithm that minimizes the global performance metric for the communication network.

13. The method of claim 12 wherein iteratively exchanging summary messages and aggregate messages such that, for at least one iteration, the communication node does not exchange one of a group consisting of: the summary messages, the aggregate messages, and both the summary messages and the aggregate messages.

14. The method of claim 13 wherein the at least one iteration is selected such that convergence is improved as compared to when the communication node exchanges both the summary messages and the aggregate messages for all iterations.

15. The method of claim 12 wherein iteratively exchanging the summary messages and the aggregate messages comprises:
    computing initial summary messages for the plurality of neighboring communication nodes and the communication node based on initialized aggregate messages for the plurality of neighboring communication nodes and the communication node according to the min-sum algorithm;

sending each of the initial summary messages for the plurality of neighboring communication nodes to a corresponding one of the plurality of neighboring communication nodes;

receiving initial summary messages from the plurality of neighboring communication nodes;

generating aggregate messages for the plurality of neighboring communication nodes and an aggregate message for the communication node based on the initial summary messages received from the plurality of neighboring communication nodes; and sending each of the aggregate messages for the plurality of neighboring communication nodes to a corresponding one of the plurality of neighboring communication nodes.

16. The method of claim 15 wherein iteratively exchanging the summary messages and the aggregate messages further comprises performing a plurality of iterations of:

receiving aggregate messages from the plurality of neighboring communication nodes;

computing summary messages for the plurality of neighboring communication nodes and a summary message for the communication node based on the aggregate messages received from the plurality of neighboring communication nodes according to the min-sum algorithm;

sending each of the summary messages for the plurality of neighboring communication nodes to a corresponding one of the plurality of neighboring communication nodes;

receiving summary messages from the plurality of neighboring communication nodes;

generating aggregate messages for the plurality of neighboring communication nodes and an aggregate message for the communication node based on the summary messages received from the plurality of neighboring communication nodes; and sending each of the aggregate messages for the plurality of neighboring communication nodes to a corresponding one of the plurality of neighboring communication nodes;

wherein performing the plurality of iterations comprises performing the plurality of iterations until the predefined stopping criteria is satisfied.

17. The method of claim 16 wherein the predefined stopping criteria is a predefined maximum number of iterations.

18. The method of claim 12 wherein iteratively exchanging the summary messages and the aggregate messages comprises:

initializing summary messages for the plurality of neighboring communication nodes and a summary message for the communication node;

sending each of the initial summary messages for the plurality of neighboring communication nodes to a corresponding one of the plurality of neighboring communication nodes; and receiving summary messages from the plurality of neighboring communication nodes.

19. The method of claim 18 wherein iteratively exchanging the summary messages and the aggregate messages further comprises performing a plurality of iterations of:

generating aggregate messages for the plurality of neighboring communication nodes and an aggregate message for the communication node based on the summary messages received from the plurality of neighboring communication nodes;

sending each of the aggregate messages for the plurality of neighboring communication nodes to a corresponding one of the plurality of neighboring communication nodes;

receiving aggregate messages from the plurality of neighboring communication nodes;

computing summary messages for the plurality of neighboring communication nodes and a summary message for the communication node based on the aggregate messages received from the plurality of neighboring communication nodes according to the min-sum algorithm;

sending each of the summary messages for the plurality of neighboring communication nodes to a corresponding one of the plurality of neighboring communication nodes; and receiving summary messages from the plurality of neighboring communication nodes;

wherein performing the plurality of iterations comprises performing the plurality of iterations until the predefined stopping criteria is satisfied.

20. The method of claim 16 wherein computing the summary messages for the plurality of neighboring communication nodes and the summary message for the communication node comprises, for each summary message:

for each possible value of a plurality of possible values for the local parameter for the communication node:

determining a minimum value of a sum of a weighted local performance metric for the communication node and a summation of the aggregate messages received from the plurality of neighboring communication nodes excluding the corresponding one of the plurality of neighboring communication nodes for which the summary message is computed across all combinations of possible values for the local parameters for the plurality of neighboring communication nodes and the communication node.

21. The method of claim 20 wherein generating the aggregate messages for the plurality of neighboring communication nodes and the aggregate message for the communication node comprises, for each aggregate message, summing the summary messages received from the plurality of neighboring communication nodes and the summary message computed for the communication node excluding the summary message from the corresponding one of the plurality of neighboring communication nodes and the communication node for which the aggregate message is generated.

22. The method of claim 21 wherein computing the summary messages for the plurality of neighboring communication nodes and the summary message for the communication node comprises, for each summary message, computing the summary message according to the following equation:

$$\mu_{M_i \to p_k}(p_k) = \min_{p_{\mathcal{A}_i \setminus \{k\}}} \left\{ w_i M_i(p_{\mathcal{A}_i}) + \sum_{j \in \mathcal{A}_i \setminus \{k\}} \mu_{p_j \to M_i}(p_j) \right\},$$

where the communication node is an i-th communication node in the communication network; $\mu_{M_i \to p_k}(p_k)$ is the summary message from the i-th communication node to a k-th communication node among an inclusive list of neighboring communication nodes, $\mathcal{A}_i$, for the i-th communication node that includes both the plurality of neighboring communication nodes and the i-th communication node; $w_i$ is a predefined weight assigned to the i-th communication node; $M_i$ is a local performance metric of the i-th communication node that is a function of a vector comprising the local parameters of all of the communication nodes in the inclusive list of neighboring communication nodes for the i-th communication node; and $\mu_{p_j \to M_i}(p_j)$ is the aggregate message from a j-th communication node to the i-th communication node where the j-th communication node is one of the communication nodes in the inclusive list of neighboring communication nodes for the i-th communication node.

23. The method of claim 22 wherein computing the aggregate messages for the plurality of neighboring communication nodes and the aggregate message for the communication node comprises, for each aggregate message, generating the aggregate message according to the following equation:

$$\mu_{p_i \to M_k}(p_i) = \sum_{j \in \mathcal{A}_i \setminus \{k\}} \mu_{M_j \to p_i}(p_i),$$

where the communication node is an i-th communication node in the communication network; $\mu_{p_i \to M_k}(p_i)$ is the aggregate message from the i-th communication node to a k-th communication node among an inclusive list of neighboring communication nodes, $\mathcal{A}_i$, for the i-th communication node that includes both the plurality of neighboring communication nodes and the i-th communication node; and $\mu_{M_j \to p_i}(p_i)$ is the summary message to the i-th communication node from a j-th communication node the inclusive list of neighboring communication nodes, $\mathcal{A}_i$, for the i-th communication node.

24. The method of claim 23 wherein computing the optimal value for the local parameter of the communication node comprises:
  summing the summary messages received by the communication node in a final iteration of the plurality of iterations to provide summation results; and
  determining that the possible value of the plurality of possible values for the local parameter for the communication node that corresponds to a minimum value in the summation results is the optimal value for the local parameter of the communication node.

25. The method of claim 24 wherein summing the summary messages received by the communication node in the final iteration of the plurality of iterations to provide the summation results and determining that the possible value of the plurality of possible values for the local parameter for the communication node that corresponds to the minimum value in the summation results is the optimal value for the local parameter of the communication node are performed according to the following equation:

$$p_i^* = \operatorname*{argmin}_{p_i} \left\{ \sum_{j \in \mathcal{A}_i} \mu_{M_j \to p_i}^{(n_f)}(p_i) \right\},$$

where $p_i^*$ is the optimal value for the local parameter of the communication node and $n_f$ denotes the final iteration of the plurality of iterations.

26. The method of claim 1 wherein iteratively exchanging the messages comprises iteratively exchanging the messages with the plurality of neighboring communication nodes in the communication network according to a predefined schedule.

27. The method of claim 26 wherein the predefined schedule improves a convergence on the optimal values of the local parameters of the communication nodes in the communication network.

28. A communication node in a communication network, comprising:
  a transceiver subsystem configured to enable communication with a plurality of neighboring communication nodes in the communication network; and
  a processing subsystem associated with the transceiver subsystem adapted to:
    iteratively exchange messages with the plurality of neighboring communication nodes in the communication network via the transceiver subsystem based on a factor graph until a predefined stopping criteria is satisfied, the factor graph modeling discrete local parameters to be coordinated among communication nodes in the communication network and corresponding performance metrics of the communication nodes; and
    compute an optimal value for the local parameter of the communication node based on results of iteratively exchanging the messages with the plurality of neighboring communication nodes.

29. The communication node of claim 28 wherein, in order to compute the optimal value for the local parameter of the communication node, the processing subsystem is further adapted to compute the optimal value for the local parameter of the communication node such that the optimal value for the local parameter and corresponding optimal parameters determined by other communication nodes in the communication network together optimize a global performance metric for the communication network.

30. The communication node of claim 29 wherein the communication network is a wireless communication network.

31. The communication node of claim 30 wherein the wireless communication network is a cellular communication network.

32. The communication node of claim 29 wherein, in order to iteratively exchange the messages with the plurality of neighboring communication nodes, the processing subsystem is further adapted to iteratively exchange the messages with the plurality of neighboring communication nodes according to a min-sum algorithm that minimizes the global performance metric for the communication network.

33. The communication node of claim 32 wherein the communication network is a wireless communication network, the communication nodes in the wireless communication network are access nodes, and the global performance metric represents a number of collisions in frequency between at least one of a group consisting of: frequencies used by neighboring access nodes or frequencies used in cells served by neighboring access nodes.

34. The communication node of claim 32 wherein the communication network is a wireless communication network, the communication nodes in the wireless communication network are access nodes, and the global performance metric represents a cross-correlation between at least one of a group consisting of: reference signals used by neighboring access nodes or reference signals used in cells served by neighboring access nodes.

35. The communication node of claim 32 wherein the communication network is a wireless communication network, the communication nodes in the wireless communication network are access nodes, and the global performance metric represents a negative sum data throughput for at least one of a group consisting of: neighboring access nodes or cells served by neighboring access nodes.

36. A non-transitory computer readable medium storing software for instructing a processing subsystem of a communication node in a communication network to:
- iteratively exchange messages with a plurality of neighboring communication nodes in the communication network based on a factor graph until a predefined stopping criteria is satisfied, the factor graph modeling discrete local parameters to be coordinated among communication nodes in the communication network and corresponding performance metrics of the communication nodes; and
- compute an optimal value for the local parameter of the communication node based on results of iteratively exchanging the messages with the plurality of neighboring communication nodes.

37. The non-transitory computer readable medium of claim 36 wherein the communication network is a wireless communication network.

38. The non-transitory computer readable medium of claim 37 wherein the wireless communication network is a cellular communication network.

39. The non-transitory computer readable medium of claim 36 wherein, in order to compute the optimal value for the local parameter of the communication node, the software further instructs the processing subsystem to compute the optimal value for the local parameter of the communication node such that the optimal value for the local parameter and corresponding optimal parameters determined by the other communication nodes in the communication network together optimize a global performance metric for the communication network.

40. The non-transitory computer readable medium of claim 39 wherein, in order to iteratively exchange the messages with the plurality of neighboring communication nodes, the software further instructs the processing subsystem to iteratively exchange the messages with the plurality of neighboring communication nodes according to a min-sum algorithm that minimizes the global performance metric for the communication network.

41. The non-transitory computer readable medium of claim 40 wherein the communication network is a wireless communication network, the communication nodes in the wireless communication network are access nodes, and the global performance metric represents a number of collisions in frequency between at least one of a group consisting of: frequencies used by neighboring access nodes or frequencies used in cells served by neighboring access nodes.

42. The non-transitory computer readable medium of claim 40 wherein the communication network is a wireless communication network, the communication nodes in the wireless communication network are access nodes, and the global performance metric represents a cross-correlation between at least one of a group consisting of: reference signals used by neighboring access nodes or reference signals used in cells served by neighboring access nodes.

43. The non-transitory computer readable medium of claim 40 wherein the communication network is a wireless communication network, the communication nodes in the wireless communication network are access nodes, and the global performance metric represents a negative sum data throughput for at least one of a group consisting of: neighboring access nodes or cells served by neighboring access nodes.

\* \* \* \* \*

UNITED STATES PATENT AND TRADEMARK OFFICE
CERTIFICATE OF CORRECTION

PATENT NO. : 8,879,428 B2
APPLICATION NO. : 13/308776
DATED : November 4, 2014
INVENTOR(S) : Hui et al.

Page 1 of 1

It is certified that error appears in the above-identified patent and that said Letters Patent is hereby corrected as shown below:

On the Title Page, in Item (54), in Title, in Column 1, Line 1, delete "METHOD" and insert -- METHODS --, therefor On the Title Page, in Item (57), under "ABSTRACT", in Column 2, Line 1, delete "METHOD" and insert -- METHODS --, therefor.

In the Specification

In Column 2, Lines 52-53, delete "DRAWING FIGURES" and insert -- DRAWINGS/FIGURES --, therefor.

In Column 4, Line 10, delete "in $\mathcal{A}$," and insert -- in $\mathcal{A}_i$, --, therefor.

In Column 4, Line 11, delete "in $\mathcal{A}$." and insert -- in $\mathcal{A}_i$. --, therefor.

In Column 4, Line 14, delete "list $\mathcal{A}$" and insert -- list $\mathcal{A}_i$ --, therefor.

In Column 4, Line 17, delete "in $\mathcal{A}$." and insert -- in $\mathcal{A}_i$. --, therefor.

In Column 6, Line 7, delete " $u_{p_k \to M_i}(p_k)$ " and insert -- $\mu_{p_k \to M_i}(p_k)$ --, therefor.

Signed and Sealed this
Fifteenth Day of December, 2015

Michelle K. Lee
*Director of the United States Patent and Trademark Office*